US009531256B2

(12) United States Patent
Shah et al.

(10) Patent No.: US 9,531,256 B2
(45) Date of Patent: Dec. 27, 2016

(54) AC-DC CONVERTER WITH ADJUSTABLE OUTPUT

(71) Applicant: AVOGY, INC., San Jose, CA (US)

(72) Inventors: Hemal N. Shah, San Mateo, CA (US); Vinod Khosla, Portola Valley, CA (US)

(73) Assignee: Avogy, Inc., San Jose, CA (US)

( * ) Notice: Subject to any disclaimer, the term of this patent is extended or adjusted under 35 U.S.C. 154(b) by 90 days.

(21) Appl. No.: 14/095,759

(22) Filed: Dec. 3, 2013

(65) Prior Publication Data

US 2015/0155775 A1     Jun. 4, 2015

(51) Int. Cl.
*H02M 7/06* (2006.01)
*H02M 1/42* (2007.01)
*G05F 3/26* (2006.01)
*H02M 7/217* (2006.01)

(52) U.S. Cl.
CPC .............. *H02M 1/4208* (2013.01); *G05F 3/26* (2013.01); *H02M 1/42* (2013.01); *H02M 7/06* (2013.01); *H02M 7/217* (2013.01); *Y02B 70/126* (2013.01)

(58) Field of Classification Search
CPC ..................................................... H02M 7/06
USPC .................. 323/208, 315, 282; 315/247, 224
See application file for complete search history.

(56) References Cited

U.S. PATENT DOCUMENTS

| | | | |
|---|---|---|---|
| 5,936,393 A * | 8/1999 | Nauta | ........................... 323/316 |
| 2004/0264230 A1* | 12/2004 | Brand | ................. H04L 25/0288 365/145 |
| 2007/0176628 A1* | 8/2007 | Takagi | ............................. 326/30 |
| 2008/0205093 A1* | 8/2008 | Davies | .................. H02J 3/1864 363/35 |
| 2008/0265944 A1* | 10/2008 | Muraoka et al. | ............... 326/86 |
| 2011/0085354 A1* | 4/2011 | Wang et al. | ............... 363/21.02 |
| 2012/0026759 A1* | 2/2012 | Balakrishnan et al. | ... 363/21.15 |
| 2012/0043807 A1* | 2/2012 | Ichikawa | ....................... 307/9.1 |
| 2014/0153304 A1 | 6/2014 | Angkititrakul et al. | |

* cited by examiner

*Primary Examiner* — Matthew Nguyen
*Assistant Examiner* — Trinh Dang
(74) *Attorney, Agent, or Firm* — Kilpatrick Townsend & Stockton LLP

(57) ABSTRACT

An electrical adapter can include a rectifying circuit configured to receive an AC power input, a power factor corrector (PFC) circuit coupled with an output of the rectifying circuit, and a capacitive component coupled with an output of the PFC circuit. The electrical adapter can further include a DC-DC converter circuit coupled with an output of the capacitive component and configured to provide a power output of the electrical adapter, and an impedance-measuring circuit coupled with the power output and configured to measure impedance of a cable connected to the power output. The DC-DC converter circuit can be configured to adjust power of the power output based on the measured impedance.

17 Claims, 6 Drawing Sheets

AC-DC CONVERTER WITH ADJUSTABLE OUTPUT

Power electronics are widely used in a variety of applications. Power electronic circuits are commonly used to convert the form of electrical energy, for example, from AC to DC, from one voltage level to another, or in some other way. Such devices can operate over a wide range of power levels, from milliwatts in mobile devices to hundreds of megawatts in a high voltage power transmission system. Despite the progress made in power electronics, there is a need in the art for improved electronics systems and methods of operating the same.

SUMMARY OF THE INVENTION

The present invention relates generally to power converter. More specifically, the present invention relates to an AC-DC converter that can detect and compensate for different output impedances. This can, for example, allow for a user to utilize different lengths of cable with the power converter, adjusting the length of the cable to adapt to the user's needs. This concept can be extended further to allow cables to be connected in series to provide an overall length of cable suitable for a user's needs.

An example electrical adapter, according to the disclosure, can include a rectifying circuit configured to receive an AC power input, a power factor corrector (PFC) circuit coupled with an output of the rectifying circuit, and a capacitive component coupled with an output of the PFC circuit. The electrical adapter can further include a DC-DC converter circuit coupled with an output of the capacitive component and configured to provide a power output of the electrical adapter, and an impedance-measuring circuit coupled with the power output and configured to measure impedance of a cable connected to the power output. The DC-DC converter circuit can be configured to adjust power of the power output based on the measured impedance.

An example method of providing adjustable output with an electrical adapter, according to the disclosure, can include rectifying an AC power input, providing power factor (PF) correction to the rectified AC power input to provide a PF-corrected output, and filtering the PF-corrected output with a capacitive component. The method can further include providing a power output of the electrical adapter by converting, with DC-DC converter circuit, an output of the capacitive component; measuring impedance of a cable connected to the power output and adjusting the power output based on the measured impedance.

An example AC-DC converter, according to the disclosure, can include an input operable to receive an AC input voltage, a DC power output, and circuitry coupled with the input and the DC power output. The circuitry can be configured to rectify the AC input voltage, provide power factor correction of the rectified AC input voltage, use an output of the power factor correction to provide the DC power output, measure an impedance at the DC power output, and adjust the DC power output based on the measured impedance.

Numerous benefits are achieved by way of the present invention over conventional techniques. For example, as indicated previously, techniques provided herein enable an AC-DC converter to adapt to different cable configurations at the converter's output. This can allow a user to connect multiple cables in series to achieve an overall length suitable for the user's needs. Additionally, users can use a single power adapter to power multiple laptop computer brands using the interchangeable tips. In some embodiments, a user may be able to power up to three devices such as a laptop, a tablet, and a mobile phone using the multiple outputs so long as the total power consumed remains under the maximum available power rating of the power adapter. These and other embodiments of the invention, along with many of its advantages and features, are described in more detail in conjunction with the text below and attached figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF SPECIFIC EMBODIMENTS

The present invention relates generally to power converter. More specifically, the present invention relates to an AC-DC converter (also referred to herein as an "electrical adapter") that can detect and compensate for different output impedances due to different lengths of output cable. This can, for example, allow for a user to utilize different lengths of cable with the power converter. A use may further connect multiple cables in series to adjust the overall length of the cable to adapt to the user's needs. The AC-DC converter can be used to power any of a variety of electronic devices, such as laptop computers, USB-powered devices, and the like.

Figure 1:
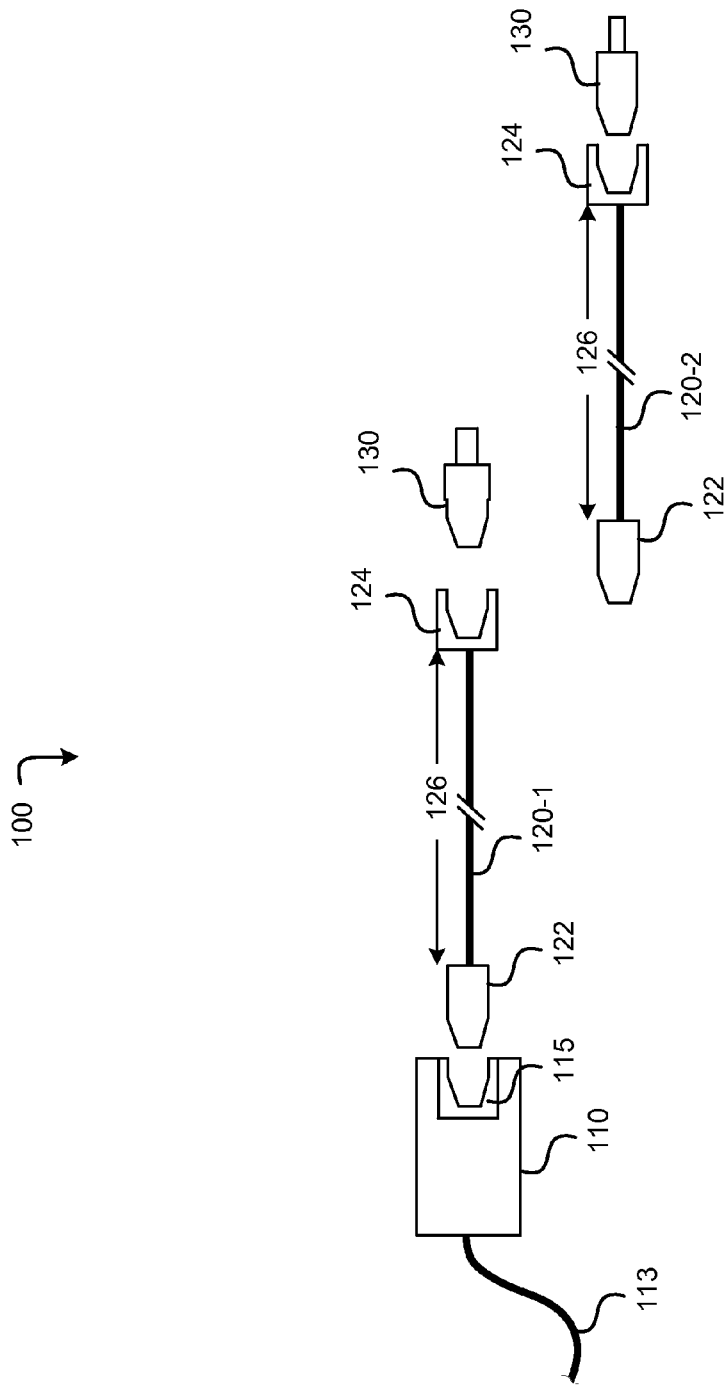
FIG. 1 is a schematic diagram illustrating an AC-DC converter configuration, according to one embodiment.

FIG. 1 is a schematic diagram illustrating an AC-DC converter configuration 100, according to one embodiment. The embodiments shown in FIG. 1 and elsewhere herein are provided as non-limiting examples. One of ordinary skill in the art would recognize many variations, modifications, and alternatives to the components provided herein. For example, the electrical adapter 110 can include one or more additional power outputs to supply power to laptop computers and/or USB-powered devices.

In the configuration 100 of FIG. 1, an electrical adapter 110 receives an AC power input from an input power cable 113 that can be plugged in to an electrical wall socket (not shown). Tolerances for the input AC power input can vary, depending on desired functionality. In some embodiments, for example, the AC power input can be between 90-265 Vrms. Other embodiments may include tolerances of lower than 90 Vrms and/or higher than 265 Vrms.

The electrical adapter 110 can provide a DC power output. Again, this output voltage can vary, depending on desired functionality. According to some embodiments, the output voltage can be between 12-19 V. Other embodiments may include tolerances of lower than 12 V and/or higher than 19 V.

The electrical adapter 110 can provide the DC power output via a female adapter 115 into which a user can plug a male adapter 122 of a power cable 120. The electrical adapter 110 can measure the impedance of the DC power output and adjust the DC power output accordingly, compensating for different lengths and/or types of power cables 120. Thus, power cables can include both male adapters 122 and female adapters 124 that enable a second power cable 120-2 to plug into a first power cable 120-1, which is plugged into the electrical adapter 110. Different-sized male adapters 130 can plug into the female adapters 124 of the power cables 120 to accommodate different types of devices (e.g., different types or brands of laptop computers). Alternative embodiments may use male and/or female adapters differently.

Embodiments can accommodate any number of different configurations of cables. As an example, embodiments may be configured to accommodate up to three cables 120 connected in series, each having a length 126 of six feet. Such embodiments can allow the user to use the electrical adapter 110 to provide power via cables having 6, 12, or 18 feet in total length. Other embodiments may accommodate more or less cables 120, and/or cables 120 of differing lengths (e.g., a first power cable 120-1 six feet in length connected with a second power cable 120-2 three feet in length, and so forth), as discussed in more detail hereafter. A person of ordinary skill in the art will recognize many variations.

Figure 2:
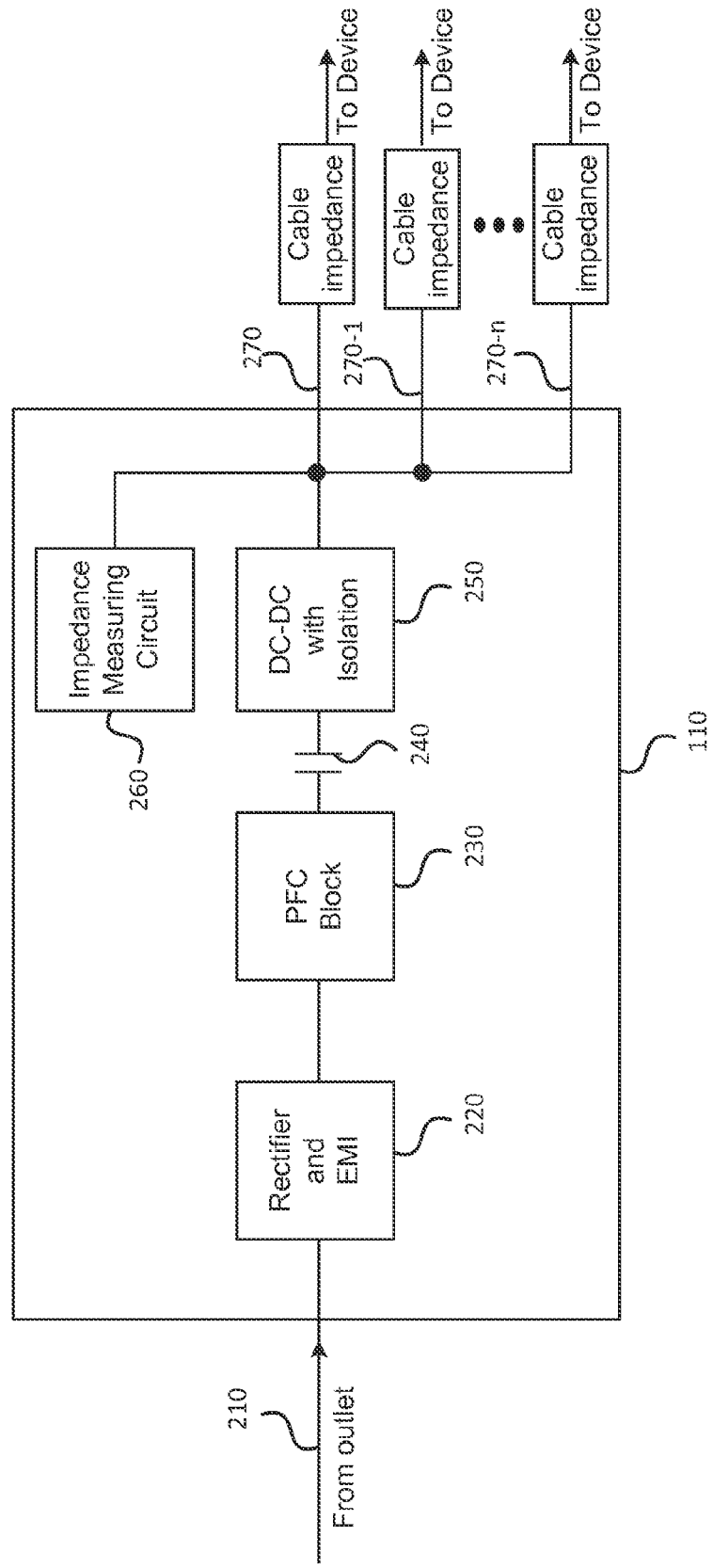
FIG. 2 is a functional block diagram illustrating the components of an electrical adapter 110, according to one embodiment.

FIG. 2 is a functional block diagram illustrating the components of an electrical adapter 110, according to one embodiment. Although the components illustrated in FIG. 2 are divided into separate blocks based on functionality, embodiments are not so limited. The illustrated components can be, for example, implemented in electrical circuitry (comprising hardware and/or software), which may be combined and/or further divided. Moreover, components further may be added or omitted, depending on desired functionality. Gallium nitride (GaN)-based components such as diodes, transistors, and the like, can be utilized in one or more of the illustrated components. This can enable the electrical adapter 110 to be manufactured in a smaller form factor.

The electrical adapter 110 can receive an input 210 from a power outlet (e.g., via power cable 113 of FIG. 1), which is provided to rectifying circuitry 220. The rectifying circuitry 220 can be implemented in any of a variety of ways, depending on desired functionality. In some embodiments, as indicated previously, the rectifying circuitry 220 can include one or more components, such as diodes, comprising GaN. Because GaN-based components can be smaller than similar components based in other materials, this can allow for the rectifying circuitry 220, and the electrical adapter 110 as a whole, to be provided in a smaller, more convenient form factor. The rectifying circuitry 220 can additionally or alternatively include circuitry to filter and/or otherwise compensate for electromagnetic interference (EMI).

An output of the rectifying circuitry can be provided to a power factor corrector (PFC) circuit 230, which can provide power factor correction to the rectified AC input to reduce transmission losses and improve voltage regulation of the electrical adapter 110. The output of the PFC circuit 230 can then be fed to a capacitor 240 or other capacitive component to provide additional signal filtering. The capacitor can be a hold-up capacitor and can be used to provide up to 20 ms of hold-up time in the event of an AC brown out condition. A typical range for this capacitor can be of the order of 10-400 uF.

The capacitor 240 can be coupled with a DC-DC converter circuit 250 to provide the desired DC output voltage to the DC power output 270 of the electrical adapter 110. As with other components provided herein, the DC-DC converter circuit can implement any of a variety of topologies, depending on desired functionality, manufacturing concerns, and/or other factors. As indicated in FIG. 2, the DC-DC converter circuit can additionally provide isolation between input and output, in some embodiments.

An impedance-measuring circuit 260 is also coupled to the DC power output 270 such that it can measure the load impedance at the output. Different cable configurations can have different levels of impedance, and the electrical adapter 110 can compensate accordingly. As discussed in more detail hereafter, the impedance-measuring circuit 260 can provide a feedback and/or other input to the DC-DC converter circuit, which can compensate for increased output impedance with a corresponding increase in power of the DC power output 270. In an embodiment, the electrical adapter 110 may include a plurality of DC power outputs 270-1, . . . , 270-n, where n is a positive integer greater than or equal to unity.

Figure 3:
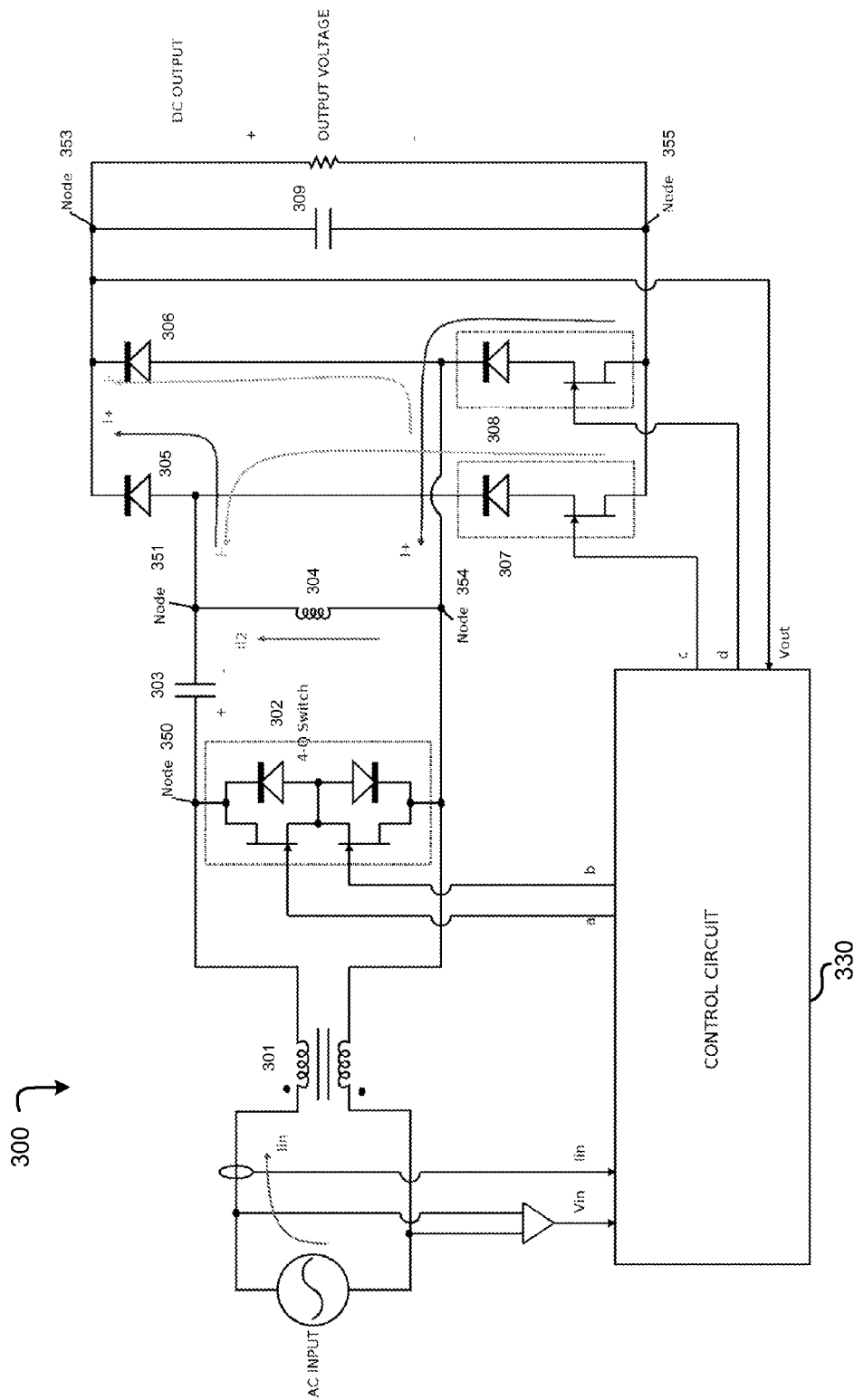
FIG. 3 is a schematic diagram illustrating an AC-DC converter circuit, according to one embodiment, which can be utilized in conjunction with the techniques described herein.

FIG. 3 is a schematic diagram illustrating an AC-DC converter circuit 300, according to one embodiment. The AC-DC converter circuit 300 may be utilized, at least in part, in the electrical adapter 110 of FIG. 1, together with an impedance-measuring circuit, to accommodate difference output impedances, according to the techniques described herein. Here, an AC input voltage can be provided at input nodes of an inductive element 301 (e.g., coupled inductor), and a DC output voltage is generated between an output node 353 and an output node 355. The DC output voltage may be provided to one of the DC power outputs 270, 270-1, . . . , 270-n, as shown in FIG. 2. The embodiment includes an inductive element 301, an inductor 304, a four-quadrant (4-Q) switch 302, an AC capacitor 303, a DC capacitor 309, diodes 305 and 306, and two voltage-bidirectional two-quadrant switches 307 and 308. Embodiments shown in FIG. 3 and elsewhere herein are provided as non-limiting examples. One of ordinary skill in the art would recognize many variations, modifications, and alternatives to the components provided herein.

The 4-Q switch 302, connected between node 350 and node 354, is a switch capable of conducting current in both positive and negative directions when switched on. When switched off, the 4-Q switch 302 can block both positive and negative voltages. The embodiment shown in FIG. 3 has a 4-Q switch 302 with two control-signal inputs, comprising two transistors and two diodes. However, the components and architecture of the 4-Q switch 302 can vary, depending on desired functionality and other concerns. Embodiments utilizing an alternative 4-Q switch are included herein below. An AC capacitor 303, connected to node 350 and node 351, separates one end of the 4-Q switch 302 from the inductor 304.

The voltage-bidirectional two-quadrant switches 307 and 308 are switches that are capable of conducting current in one direction when switched on. When switched off, the voltage-bidirectional two-quadrant switches 307 and 308 can block both positive and negative voltages. The voltage-bidirectional two-quadrant switches 307 and 308 shown in FIG. 3 have a transistor coupled in series with a diode. However, similar to the 4-Q switch 302, the components and architecture of the voltage-bidirectional two-quadrant switches 307 and 308 can vary depending on desired functionality and other concerns.

A control circuit 330, a typical pulse width modulation (PWM) circuit, can be utilized to sense the AC input voltage $V_{in}$ and/or AC input current $I_{in}$ and control the 4-Q switch 302 and voltage-bidirectional two-quadrant switches 307 and 308 accordingly. As discussed in more detail below, the control circuit 330 can control the switches 302, 307, and 308 such that the input current $I_{in}$ substantially follows the waveform of the AC input voltage $V_{in}$, such that the circuit can be used as the power factor correction circuit. Additionally, in some embodiments, the control circuit 330 also can sense the DC output voltage $V_{out}$ to provide feedback to help ensure the desired DC output voltage $V_{out}$ is achieved.

Values for the various components can vary depending on desired functionality and/or other factors. According to some embodiments, for example, values for the inductive element 301 can be between 50 and 5,000 µH; values for the inductor 304 can be between 50 and 5,000 µH; values for the capacitor 303 can be between 0.01 and 3 µF; and values for the capacitor 309 can be between 3 and 300 µF. Other embodiments may include values outside these ranges. One of ordinary skill in the art would recognize many variations, modifications, and alternatives.

To enable the AC-DC converter circuit 300 to operate in high-power applications at a high switching frequency, specialized components can be utilized. For example, the switching devices, transistors and diodes, utilized in the switches 302, 307, and 308 can be devices based on a wide bandgap material, such as GaN or silicon carbide (SiC). This can enable the AC-DC converter circuit 300 to operate at higher voltages, higher temperatures, and higher frequencies than solution using traditional silicon-based devices. For universal AC input voltage, 90-265 Vrms, with a frequency of between 50 and 60 Hz, the present invention with GaN-based devices can be operated with switching frequencies up to 2 MHz. Other embodiments may include frequencies and/or voltages outside these ranges.

For AC-DC converter as a PFC pre-regulation circuit, the input current $I_{in}$ waveform is controlled to follow the ac input voltage, while regulating the dc voltage between the output nodes. The state of operation of the AC-DC converter circuit 300 depends on the polarity of the AC input voltage. During the positive AC cycle, the input current $I_{in}$ flows into the converter. The current through the inductor 304 (indicated by the arrow labeled $I_{12}$ in FIG. 3) is positive. the voltage-bidirectional two-quadrant switch 308 is turned on while the voltage-bidirectional two-quadrant switch 307 is turned off, allowing current to flow through the voltage-bidirectional two-quadrant switch 308 and diode 305 in the direction indicated by the arrows labeled I+ in FIG. 3. During this state, the voltage across the capacitor 303 is positive and approximately equals to the ac input voltage. In this state, current flows through node 350 to node 354 when the 4-Q switch is turned on. When the 4-Q switch is turned off, it blocks positive voltage from node 350 to node 354.

During a negative AC cycle (i.e., when the AC input has a negative polarity), the input current $I_{in}$ must flows out of the converter. The current through the inductor 304 (indicated by the arrow labeled $I_{12}$ in FIG. 3) is negative. The voltage across the capacitor 303 is also negative and approximately equals to the ac input voltage. In this state, the voltage-bidirectional the voltage-bidirectional two-quadrant switch 307 is turned on while the voltage-bidirectional two-quadrant switch 308 is turned off, allowing current to flow through the voltage-bidirectional two-quadrant switch 307 and diode 306 in the direction indicated by the arrows labeled I− in FIG. 3. In this state, current flows through node 354 to node 350 when the 4-Q switch is turned on. When the 4-Q switch is turned off, it blocks negative voltage from node 350 to node 354.

Additional details regarding the AC-DC converter circuit 300, including timing diagrams and alternative embodiments, can be found in U.S. application Ser. No. 13/692,717 filed Dec. 3, 2012, entitled "AC-DC CONVERTER FOR WIDE RANGE OUTPUT VOLTAGE AND HIGH SWITCHING FREQUENCY," which is hereby incorporated by reference in its entirety for all purposes.

Figure 4:
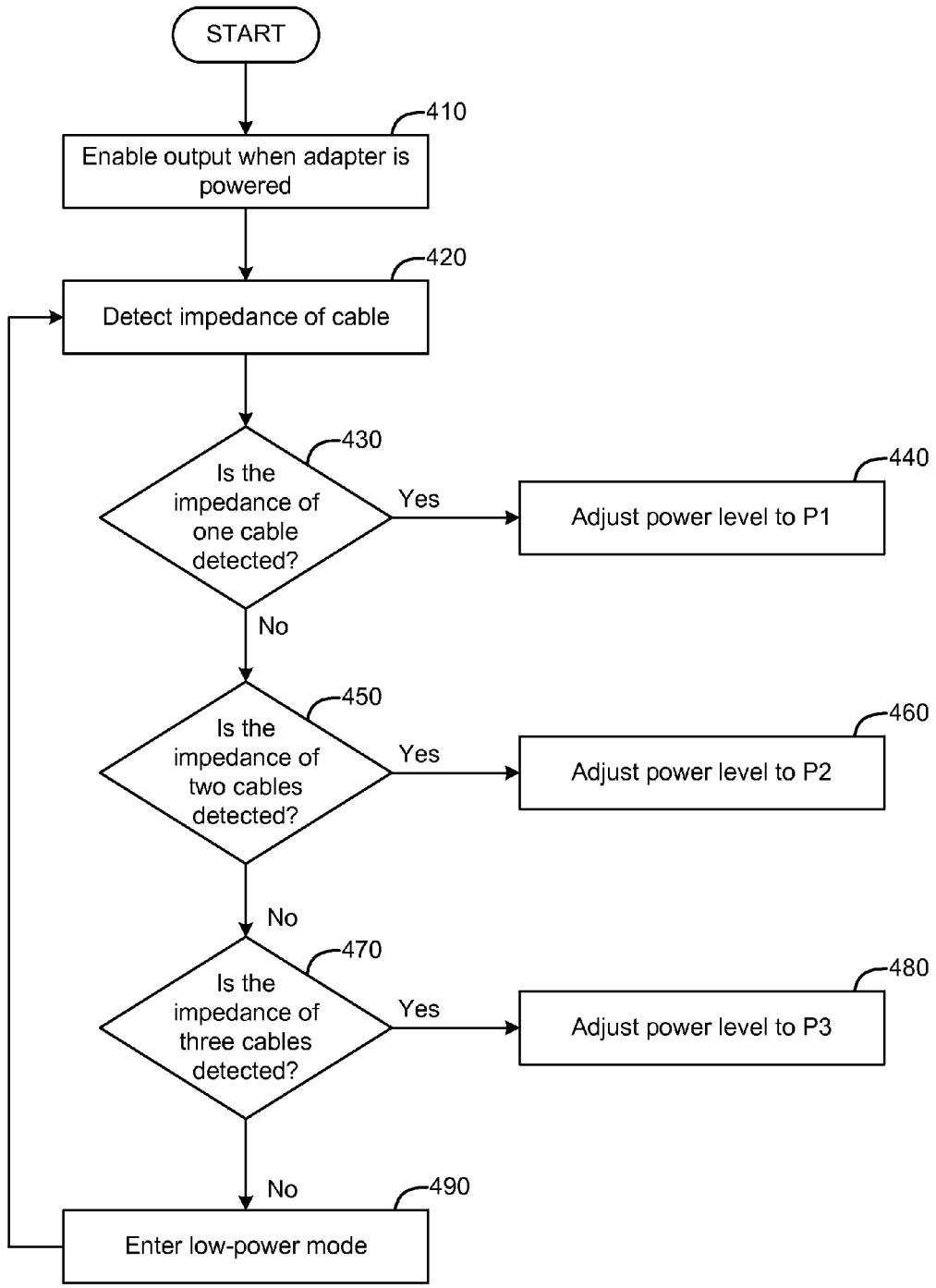
FIG. 4 is a flow diagram illustrating the functionality of an adjustable-output electrical adapter, according to one embodiment.
Figure 5:
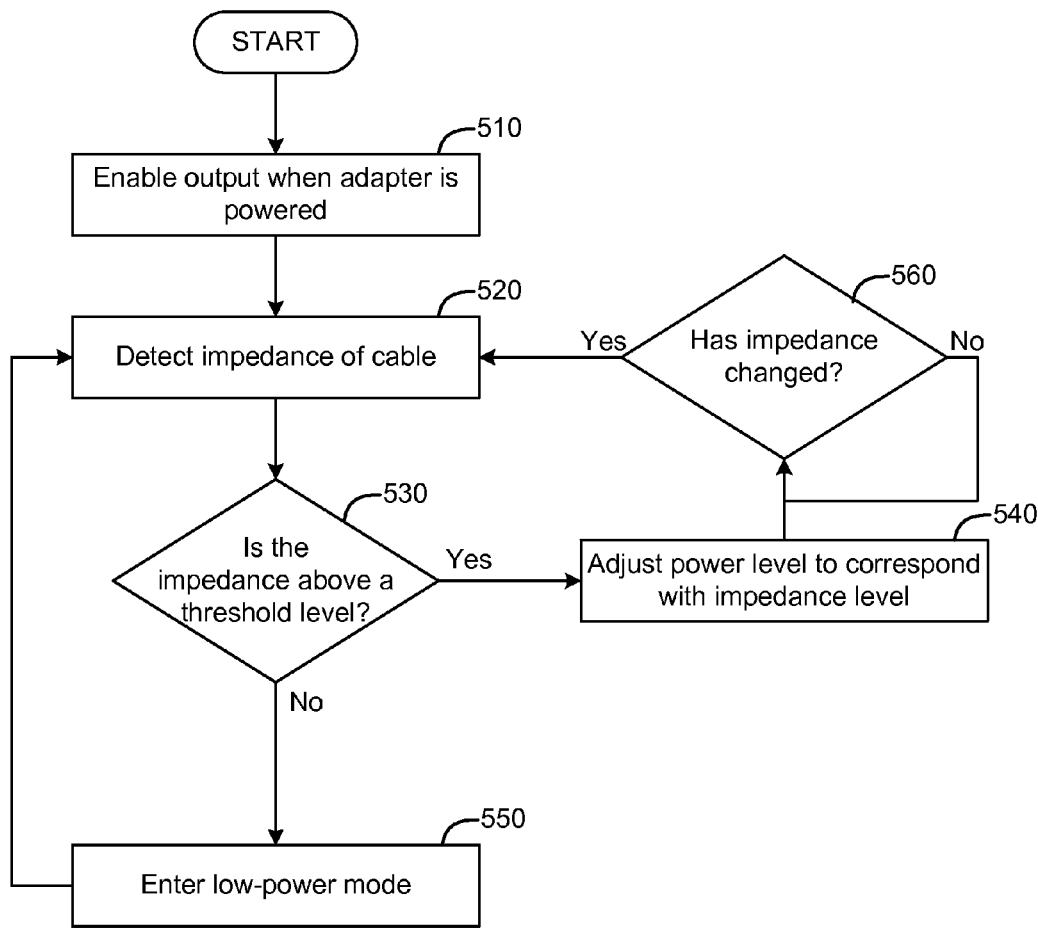
FIG. 5 is a flow diagram illustrating the functionality of an adjustable-output electrical adapter, according to another embodiment.

As indicated previously, cable configurations can vary substantially, depending on a user's needs. Embodiments can address different cable configurations in different ways. FIGS. 4 and 5 illustrate two different approaches.

FIG. 4 is a flow diagram illustrating the functionality of an adjustable-output electrical adapter (such as the electrical adapter 110 of FIG. 1, for example), according to one embodiment. The functionality can be provided by hardware and/or software, including the circuitry and other components described in relation to FIGS. 2 and 3.

At block 410, an output is enabled when the adapter is powered. As indicated previously, the voltage of the DC power output can depend on desired functionality. In some embodiments, for example, the DC output voltage can be between 12-19 V. In some embodiments, the voltage level may vary over time and/or with different loads, within acceptable tolerances. These tolerances may depend on applicable standards and/or device specifications.

At block 420, the impedance of a cable is detected, or measured. As indicated previously, an impedance-measuring circuit incorporated into an electrical adapter can be configured to determine the impedance of a cable (or series of connected cables) when the cable is plugged in to the DC power output of the electrical adapter. Depending on desired functionality, the impedance-measuring circuit may determine impedance of the cable, whether or not the cable is connected with a device.

At block 430, it is determined whether the impedance of one cable is detected. If so, then the electrical adapter can, at block 440, adjust the output DC power to a first predetermined power level, P1, to compensate for the impedance of a single cable. Whether the impedance of a single cable is detected can be determined by, for example, measuring a value—or a value within certain tolerances—indicative of the impedance of a single cable. Additionally or alternatively, a single cable may be assumed if the impedance is below a threshold value.

The functionality at blocks 450 and 470 echo that of block 430 to determine whether the impedance of two or three cables are detected, respectively. If two cables are detected, then the power level is adjusted to a second predetermined power level, P2, at block 460. If three cables are detected, then the power level is adjusted to a third predetermined power level, P3, at block 480. Otherwise, the electrical adapter can enter a low-power, or "sleep," mode at block 490, and wait until the impedance of a cable is detected at block 420.

The functionality of the adjustable-output electrical adapter illustrated in FIG. 4 allows for the electrical adapter to provide any of a discrete number of predetermined power levels, based on a measured level of impedance. Embodiments implementing such functionality can anticipate a discrete number of anticipated impedance values (e.g., anticipated cable configurations). The example illustrated in FIG. 4 demonstrates how functionality can anticipate three cable configurations (one, two, or three cables). Other embodiments may include a larger or smaller amount of anticipated configurations, including configurations in which cables with different impedances (e.g., lengths) are connected together in series.

Additionally or alternatively, an electrical adapter may be configured to provide any of a number of predetermined power levels based on a range of detected impedance, regardless of the cable configuration. For example, the electrical adapter may provide a first power level for a range of impedance values up to a first threshold value, a second power level for a range of impedance values above the first threshold value and up to a second threshold value, and so on. A person having ordinary skill in the art will recognize many variations.

FIG. 5 is a flow diagram illustrating the functionality of an adjustable-output electrical adapter (such as the electrical adapter 110 of FIG. 1, for example), according to another embodiment. As with FIG. 4, the functionality of FIG. 5 can be provided by hardware and/or software, including the circuitry and other components described in relation to FIGS. 2 and 3. In contrast to the functionality of FIG. 4, however, the functionality illustrated in FIG. 5 provides a variable output power level based on detected impedance, rather than one of a plurality of predetermined output power levels.

The functionality at blocks 510 and 520 are similar to respective blocks 410 and 420 of FIG. 4. At block 530, it is determined whether the impedance detected at block 520 is above a base threshold level. Such functionality can enable the electrical adapter to enter a low-power mode, at block 550, if a minimum impedance is not detected. Alternative embodiments, however, may not have a minimum impedance requirement, in which case the functionality of block 540 would be provided.

At block 540, the power level is adjusted to correspond with the detected impedance level. Rather than adjusting the power to a predetermined power level, embodiments employing the functionality shown in FIG. 5 can continuously vary the output power level to compensate for the detected impedance. At block 560, the impedance is monitored to determine a change in the impedance, and blocks 560, 520, 530, and 540 create a feedback loop to alter power levels in accordance with detected impedance levels.

It should be appreciated that the specific blocks shown in FIGS. 4 and 5 illustrate the functionality of an electrical adapter according to two specific embodiments. Other embodiments may include alternative and/or additional functionality. Embodiments may further include functionality that is not illustrated in FIGS. 4 and 5. Furthermore, additional steps may be added or removed depending on the particular applications. One of ordinary skill in the art would recognize many variations, modifications, and alternatives.

Figure 6:
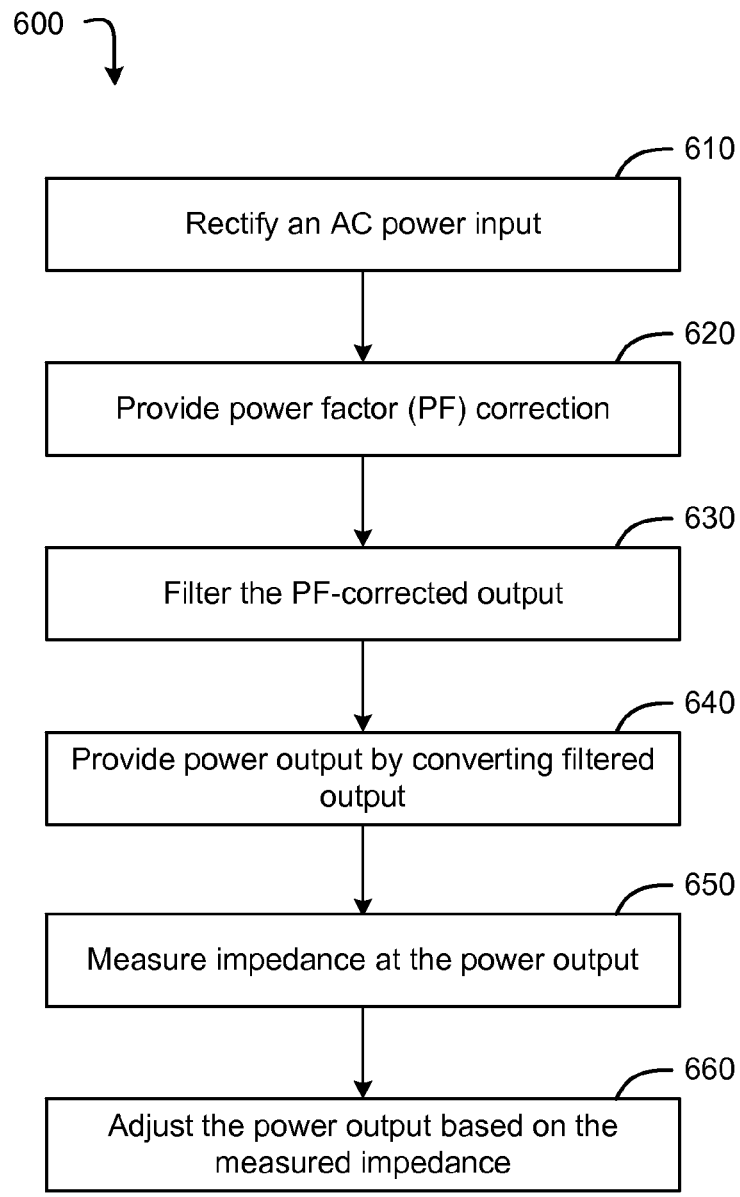
FIG. 6 is a flow diagram illustrating an embodiment of a method of providing adjustable output with an electrical adapter.

FIG. 6 is a flow diagram illustrating an embodiment of a method 600 of providing adjustable output with an electrical adapter (such as the electrical adapter 110 of FIG. 1, for example), following the functionality described in FIGS. 4 and 5. The method 600 can be executed by hardware and/or software components, including the circuitry and other components described in relation to FIGS. 2 and 3.

The method can begin by rectifying an AC power input (610). Rectification can be provided utilizing components and circuitry described in FIGS. 2 and/or 3, for example. Power factor (PF) correction is then applied to the rectified output (620), as illustrated in FIG. 2. The PF-corrected output can then be filtered (630). This filtering can be provided by a capacitive element or component, as previously described. The filtered output is then converted to provide a power output (640). DC-DC conversion can be made using DC-DC converter circuitry such detailed above with regard to FIGS. 2 and/or 3.

Adaptability for cables of varying impedances can then be provided utilizing techniques described herein above. For example, the impedance at the power output can be measured (650) using impedance-measuring circuitry, and the power at the power output can then be adjusted based on the measured impedance (660).

It should be appreciated that the specific components shown in FIG. 6 illustrate a method 600 of providing adjustable output with an electrical adapter according to one embodiment. Other embodiments may include alternative and/or additional functionality. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An electrical adapter comprising:
    a rectifying circuit configured to receive an AC power input;
    a power factor corrector (PFC) circuit coupled with an output of the rectifying circuit;
    a capacitive component coupled with an output of the PFC circuit;
    a DC-DC converter circuit coupled with an output of the capacitive component and configured to provide a power output of the electrical adapter; and
    an impedance-measuring circuit coupled with the power output and configured to measure an impedance of a cable connected to the power output;
    wherein, the DC-DC converter circuit is configured to adjust a power level of the power output based on the measured impedance, and the power level of the power output is one of a plurality of predetermined DC power levels.

2. The electrical adapter of claim 1 wherein:
    the power output comprises a first power output; and
    the electrical adapter further includes a plurality of power outputs.

3. The electrical adapter of claim 1 wherein the DC-DC converter circuit is further configured to:
    provide the power output at a first predetermined power level; and
    adjust the power output to a second predetermined power level if the measured impedance exceeds a threshold value.

4. The electrical adapter of claim 1 wherein the electrical adapter is configured to enter a low-power mode if the measured impedance is lower than a threshold value of impedance.

5. The electrical adapter of claim 1 wherein the electrical adapter includes a plurality of switches each comprising one or more transistors comprising gallium nitride (GaN).

6. The electrical adapter of claim 1 wherein the electrical adapter includes a four-quadrant switch comprising one or more diodes comprising GaN.

7. The electrical adapter of claim 1 wherein the cable comprises one or more cable elements connected in series.

8. The electrical adapter of claim 1 wherein the electrical adapter includes a two-quadrant switch comprising a GaN diode.

9. The electrical adapter of claim 7 wherein the one or more cable elements each comprise a different or a same length.

10. A method of providing adjustable output with an electrical adapter, the method comprising:
rectifying an AC power input;
providing power factor (PF) correction to the rectified AC power input to provide a PF-corrected output;
filtering the PF-corrected output with a capacitive component;
providing a power output of the electrical adapter by converting, with a DC-DC converter circuit, an output of the capacitive component;
measuring an impedance of a cable connected to the power output; and
adjusting the power output based on the measured impedance, wherein a power level of the power output is one of a plurality of predetermined DC power levels.

11. The method of claim 10 further comprising providing a plurality of power outputs.

12. The method of claim 10 further comprising:
providing the power output at a first predetermined power level; and
adjusting the power output to a second predetermined power level if the measured impedance exceeds a threshold value.

13. The method of claim 10 further comprising including causing the electrical adapter to enter a low-power mode if the measured impedance does not match a predetermined level of impedance.

14. The method of claim 10 wherein providing the power output comprises utilizing one or more transistors comprising gallium nitride (GaN).

15. The method of claim 10 wherein rectifying the AC power input comprises using one or more diodes comprising GaN.

16. An AC-DC converter comprising:
an input operable to receive an AC input voltage;
a DC power output;
a circuitry coupled with the input and the DC power output, wherein the circuitry is configured to:
rectify the AC input voltage;
provide power factor correction of a rectified AC input voltage;
use an output of the power factor correction to provide the DC power output;
measure an impedance at the DC power output; and
adjust the DC power output based on the measured impedance, wherein a power level of the DC power output is one of a plurality of predetermined DC power levels.

17. The AC-DC converter of claim 16 wherein the circuitry includes at least one of:
a transistor comprising gallium nitride (GaN), or
a diode comprising GaN.

* * * * *